(12) United States Patent
Lotz (10) Patent No.: US 11,203,287 B2
(45) Date of Patent: Dec. 21, 2021

(54) CAMERA-BASED AUTOMATIC TURN SIGNAL DEACTIVATION

(71) Applicant: PACCAR Inc, Bellevue, WA (US)

(72) Inventor: Josef Lotz, Corinth, TX (US)

(73) Assignee: PACCAR Inc, Bellevue, WA (US)

( * ) Notice: Subject to any disclaimer, the term of this patent is extended or adjusted under 35 U.S.C. 154(b) by 246 days.

(21) Appl. No.: 16/021,483

(22) Filed: Jun. 28, 2018

(65) Prior Publication Data

US 2020/0001778 A1 Jan. 2, 2020

(51) Int. Cl.
| | |
|---|---|
| *B60Q 1/42* | (2006.01) |
| *B60R 1/04* | (2006.01) |
| *B60Q 1/34* | (2006.01) |
| *B60R 1/00* | (2006.01) |
| *B60R 11/04* | (2006.01) |
| *B60R 11/00* | (2006.01) |
| *B60D 1/30* | (2006.01) |
| *B60Q 9/00* | (2006.01) |

(52) U.S. Cl.
CPC ................ B60Q 1/346 (2013.01); B60R 1/00 (2013.01); B60R 11/04 (2013.01); *B60D 1/30* (2013.01); *B60Q 9/005* (2013.01); *B60R 2011/004* (2013.01); *B60R 2300/8046* (2013.01)

(58) Field of Classification Search
CPC .......... B60D 1/30; B60D 1/305; B60D 13/00; B60D 13/02; B60D 1/00; B60Q 9/005; B60Q 1/40; B60Q 1/305; B60Q 1/346; G01B 11/26; G01B 11/27; G01B 11/272
USPC ...................... 701/28, 36; 356/138
See application file for complete search history.

(56) References Cited

U.S. PATENT DOCUMENTS

| | | | | |
|---|---|---|---|---|
| 5,240,079 A | * | 8/1993 | Schmidt | ................ A01D 33/00 172/2 |
| 5,574,443 A | | 11/1996 | Hsieh | |
| 6,975,218 B2 | | 12/2005 | Madau | |

(Continued)

FOREIGN PATENT DOCUMENTS

| | | | | |
|---|---|---|---|---|
| CA | 3044649 A1 | * | 12/2019 | ............. B60R 11/04 |
| DE | 102008059692 A1 | | 6/2010 | |

(Continued)

OTHER PUBLICATIONS

Narrow passage assistant system for rear wheel steering semi-trailer truck; Junggun Yang;Sunghwan Yun;Kunsoo Huh; 2017 2nd IEEE International Conference on Intelligent Transportation Engineering (ICITE); IEEE Conference Paper. (Year: 2017).*

(Continued)

*Primary Examiner* — Cuong H Nguyen
(74) *Attorney, Agent, or Firm* — Merchant & Gould, P.C.

(57) ABSTRACT

In some embodiments of the present disclosure, techniques are provided for automatic turn signal deactivation in a vehicle with a trailer. The vehicle includes a camera monitoring system that provides video images for display devices that replace traditional side view mirrors. In some embodiments, video information is obtained from the camera monitoring system and is used to determine an angle of the trailer. Upon activation of a turn signal indicator, the video information is used to detect departure of the trailer angle from a centered region and the subsequent return of the trailer angle to the centered region in order to automatically deactivate the turn signal indicator.

20 Claims, 6 Drawing Sheets

(56) References Cited

U.S. PATENT DOCUMENTS

| | | | |
|---|---|---|---|
| 6,982,638 B2 | | 1/2006 | Bernosky |
| 7,119,672 B2 | * | 10/2006 | Subbaraman .......... B60Q 1/346 |
| | | | 340/465 |
| 7,173,524 B2 | | 2/2007 | Ponziani |
| 7,408,455 B2 | | 8/2008 | Ponziani |
| 8,670,035 B2 | | 3/2014 | Robert |
| 9,085,261 B2 | | 7/2015 | Lu et al. |
| 9,428,119 B2 | | 8/2016 | Yellambalase |
| 9,428,185 B2 | | 8/2016 | Yellambalase et al. |
| 9,505,343 B2 | | 11/2016 | Au et al. |
| 10,046,800 B2 | * | 8/2018 | Hu ........................ B62D 15/027 |
| 10,106,193 B2 | * | 10/2018 | Lavoie .................... B60D 1/245 |
| 10,112,646 B2 | * | 10/2018 | Lavoie ................... B62D 15/029 |
| 10,638,025 B2 | * | 4/2020 | Gali ....................... B62D 15/029 |
| 10,766,525 B2 | * | 9/2020 | Lavoie ................ B60W 40/105 |
| 10,807,639 B2 | * | 10/2020 | Hu ........................ G06K 9/4609 |
| 2003/0116996 A1 | | 6/2003 | Soja |
| 2005/0195073 A1 | * | 9/2005 | Subbaraman .......... B60Q 1/346 |
| | | | 340/465 |
| 2006/0082221 A1 | * | 4/2006 | Mouzas .................... B60Q 1/12 |
| | | | 307/10.1 |
| 2008/0079553 A1 | | 4/2008 | Boice |
| 2014/0200759 A1 | * | 7/2014 | Lu ........................... B60D 1/245 |
| | | | 701/28 |
| 2014/0309855 A1 | | 10/2014 | Tran |
| 2015/0066296 A1 | * | 3/2015 | Trombley ................ G07C 5/08 |
| | | | 701/41 |
| 2015/0321697 A1 | * | 11/2015 | Lu ........................... G06T 7/246 |
| | | | 701/28 |
| 2015/0345938 A1 | | 12/2015 | Salter |
| 2016/0119539 A1 | | 4/2016 | Tan |
| 2017/0043720 A1 | | 2/2017 | Shaw |
| 2017/0320518 A1 | * | 11/2017 | Lavoie .................... B62D 13/06 |
| 2018/0134217 A1 | * | 5/2018 | Peterson ............. G06K 9/00805 |
| 2018/0319437 A1 | * | 11/2018 | Hu ........................ G06K 9/4609 |
| 2019/0009815 A1 | * | 1/2019 | Lavoie ................ B60W 40/114 |
| 2019/0297233 A1 | * | 9/2019 | Gali ...................... H04N 5/2253 |
| 2020/0001778 A1 | * | 1/2020 | Lotz ........................ B60Q 1/40 |
| 2020/0057453 A1 | * | 2/2020 | Laws .................... B60W 10/20 |
| 2020/0259976 A1 | * | 8/2020 | Gali ........................... G06T 7/80 |

FOREIGN PATENT DOCUMENTS

| | | | | |
|---|---|---|---|---|
| DE | 102009014860 A1 | | 10/2010 | |
| DE | 102016006637 A1 | | 12/2016 | |
| EP | 2017125 A2 | | 1/2009 | |
| EP | 3587184 A1 | * | 1/2020 | .............. B60R 1/00 |
| EP | 3587184 B1 | * | 1/2021 | .............. B60Q 1/40 |

OTHER PUBLICATIONS

Orientation control of a wheeled robot towing a trailer in backward motion; Ali Keymasi Khalaji;Abolfazl Yazdani; 2017 IEEE 4th International Conference on Knowledge-Based Engineering and Innovation (KBEI); IEEE Conference Paper. (Year: 2017).*

On the feedback control of hitch angle through torque-vectoring; M. Zanchetta;D. Tavernini;A. Sorniotti;P. Gruber;B. Lenzo;A. Ferrara;W. De Nijs;K. Sannen;J. De Smet; 2018 IEEE 15th International Workshop on Advanced Motion Control (AMC); IEEE Conference Paper. (Year: 2018).*

Path following of a vehicle-trailer system in presence of sliding: Application to automatic guidance of a towed agricultural implement Christophe Cariou;Roland Lenain;BenoitThuilot;Philippe Martinet; 2010 IEEE/RSJ International Conference on Intelligent Robots and Systems; IEEE Conference Paper. (Year: 2010).*

Effects of Sensor Placement and Errors on Path Following Control of a Mobile Robot-Trailer System; David W. Hodo;John Y. Hung; David M. Bevly;Scott Millhouse; 2007 American Control Conference; IEEE Conference Paper. (Year: 2007).*

Analysis and optimization of dynamic conditions fora B-Double; Abhishek Modi; 2018 XI International Science-Technical Conference Automotive Safety; IEEE Conference Paper. (Year: 2018).*

Development of a performance specification for camera/video imaging systems on heavy vehicles; WW Wierwille, WA Schaudt, JM Spaulding, SK Gupta . . . —2008—vtechworks.lib.vt.edu.*

Australian Office Action in Application 2016261354, dated Dec. 17, 2020, 6 pages.

European Search Report in Application 19182657.7, dated Nov. 27, 2019, 6 pages.

* cited by examiner

CAMERA-BASED AUTOMATIC TURN SIGNAL DEACTIVATION

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle is provided. The vehicle comprises a camera monitoring system including at least one video camera configured to view side areas of the vehicle, a turn signal indicator for signaling a turn to a side of the vehicle, and an electronic control unit (ECU). The ECU is configured to receive a signal indicating that the turn signal indicator has been activated; and, in response to determining that a set of conditions for camera-based signal deactivation are each met: determine, based on information received from the camera monitoring system, that an angle of a trailer coupled to the vehicle has departed from a centered region in the direction of the turn signal indicator; and in response to determining, based on information received from the camera monitoring system, that the angle of the trailer has returned to the centered region from the direction of the turn signal indicator, transmit a signal to deactivate the turn signal indicator.

In some embodiments, a method of automatically controlling a turn signal in a vehicle coupled to a trailer is provided. An ECU of the vehicle receives a signal indicating that a turn signal indicator has been activated. In response to determining that a set of conditions for camera-based signal deactivation are each met, the ECU determines, based on information received from a camera monitoring system, that an angle of the trailer has departed from a centered region in the direction of the turn signal indicator. In response to determining, based on information received from the camera monitoring system, that the angle of the trailer has returned to the centered region from the direction of the turn signal indicator, the ECU transmits a signal to deactivate the turn signal indicator.

In some embodiments, a non-transitory computer-readable medium having computer-executable instructions stored thereon is provided. The instructions, in response to execution by an electronic control unit (ECU) of a vehicle, cause the ECU to perform actions for automatically controlling a turn signal in a vehicle coupled to a trailer, the actions comprising: receiving, by an ECU of the vehicle, a signal indicating that a turn signal indicator has been activated; and in response to determining that a set of conditions for camera-based signal deactivation are each met: determining, by the ECU based on information received from a camera monitoring system, that an angle of the trailer has departed from a centered region in the direction of the turn signal indicator; and in response to determining, based on information received from the camera monitoring system, that the angle of the trailer has returned to the centered region from the direction of the turn signal indicator, transmitting, by the ECU, a signal to deactivate the turn signal indicator.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Turn signals are common devices on vehicles. When a turn signal is desired, an operator of the vehicle actuates a turn signal switch, which activates an associated turn signal indicator. For example, if the operator intends to make a right-hand turn, the operator will actuate a turn signal switch to activate the right turn signal indicator. Once the vehicle is through the intersection and has completed the turn, the turn signal indicator is deactivated. For passenger vehicles such as automobiles, this deactivation may occur automatically when the steering wheel has returned to a neutral or straight position. If the deactivation does not occur automatically, the operator must manually deactivate the turn signal indicator by manually returning the turn signal switch to a neutral or deactivated position. Deactivation of the turn signal indicator is desired to prevent miscommunication to other vehicles on the road.

For a semi-trailer truck combination, the automatic deactivation of the turn signal indicator is more complicated. Regulations state that the vehicle must continue to signal its turn until the turn is complete, which includes the trailer traveling completely around the corner and through the intersection. For Class 8 trucks towing long trailers, the truck may have straightened its steering wheel long before the trailer has traveled all the way through the corner. Accordingly, basing the turn signal deactivation solely on the position of the steering wheel is not possible. Canceling the turn signal based on the relative angle between the truck and the trailer is preferred. While detecting this relative angle using a sensor that detects a rotational position of a fifth wheel device may be possible, such a sensor would add to the mechanical complexity of the vehicle, and is therefore undesirable. What is desired are devices and techniques that can use information from other systems already mounted on the vehicle to determine the angle between the trailer and the truck, and to use this information for automatic turn signal deactivation.

Figure 1A:
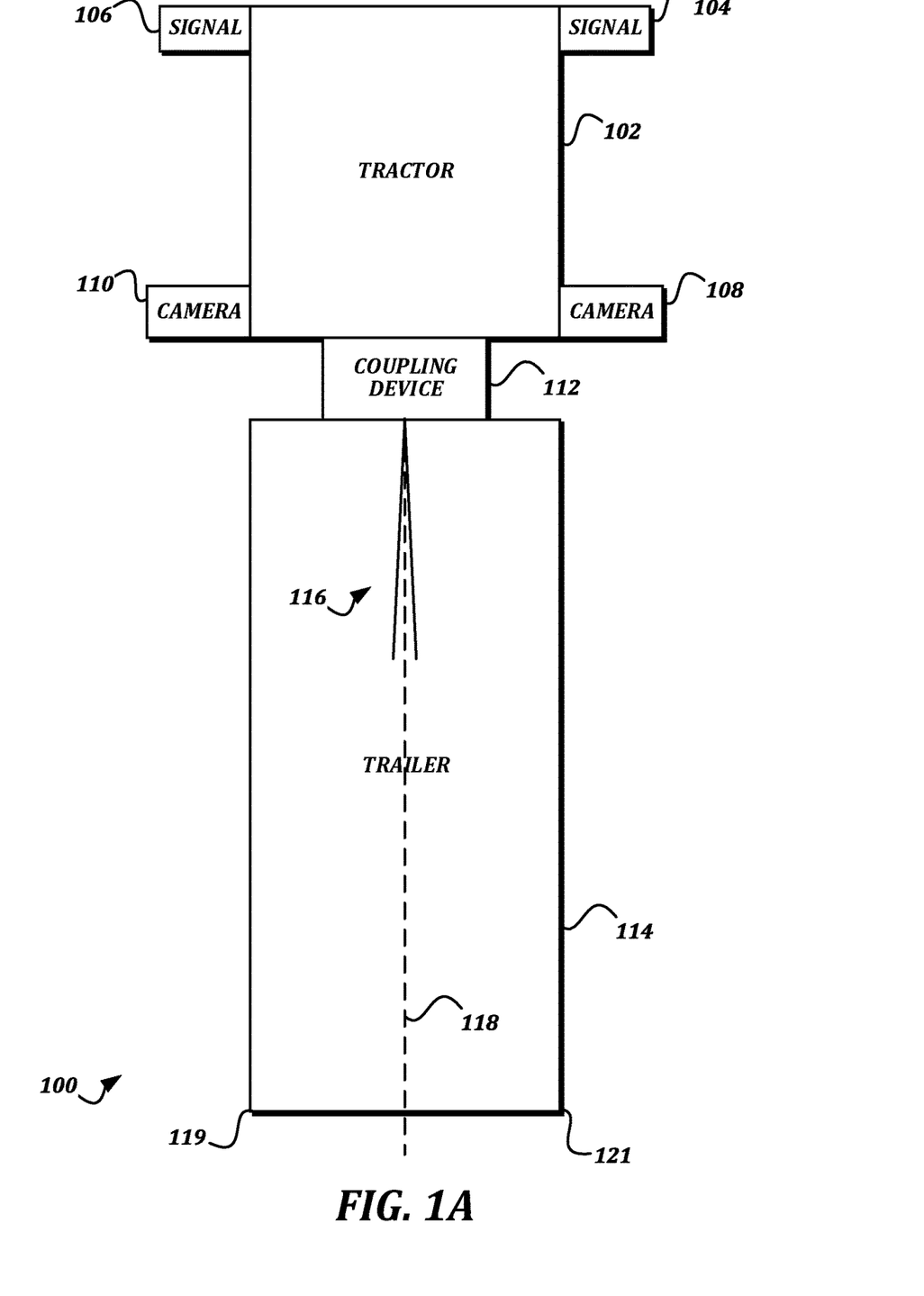
FIG. 1A is a schematic diagram that illustrates an example embodiment of a vehicle combination according to various aspects of the present disclosure.

FIG. 1A is a schematic diagram that illustrates an example embodiment of a vehicle combination according to various aspects of the present disclosure. The vehicle combination 100 includes a tractor 102 and a trailer 114. The tractor 102 and the trailer 114 are rotatably coupled to each other via a coupling device 112 such as a fifth wheel device, a ball hitch, a gooseneck, or any other suitable type of pivot joint. The vehicle combination 100 includes turn signal indicators 104, 106. Though two turn signal indicators 104, 106 are illustrated on the tractor 102, additional turn signal indicators may be present on the tractor 102 and/or on the trailer 114, particularly at a rear portion of the trailer 114. All of the turn signal indicators 104, 106, may be controlled by a turn signal controller device as discussed below.

In some embodiments, the tractor 102 may also include a camera monitoring system that includes cameras 108, 110 mounted on each side of the tractor 102. Typically, the cameras 108, 110 may be used to monitor blind spots around the vehicle combination 100, and/or may be used to replace or enhance traditional side-view mirrors on the tractor 102. In some embodiments, each camera 108, 110 may provide a wide field of view, such that substantially all of the entire range of motion of the trailer 114 can be captured by the cameras 108, 110 without physically panning or otherwise changing the viewpoint of the cameras. For example, the camera 110 may be positioned and configured with appropriate optics to be capable of visualizing the entire range of motion of the left rear corner 119 of the trailer 114, and the camera 108 may be positioned and configured with appropriate optics to be capable of visualizing the entire range of motion of the right rear corner 121 of the trailer 114. To present an appropriate view on a display device that replaces a traditional side-view mirror, a version of the wide field of view image may be used that has been digitally panned, cropped, and zoomed to show only a relevant portion of the wide field of view.

As shown, the trailer 114 includes a midline 118 extending down the axis of the vehicle combination 100. In some embodiments, a centered region 116 may be defined. The centered region 116 is a predetermined range of angular positions of the midline 118 with respect to the coupling device 112. When the vehicle combination 100 is oriented to travel straight, the midline 118 is within the centered region 116. In some embodiments, the centered region 116 may be a number of degrees off of center that the midline 118 may rotate without being considered outside of the centered region 116. As a nonlimiting example, the centered region 116 may be configured to be two degrees wide. In some embodiments, the size of the centered region 116 may be configurable by the operator.

Figure 1B:
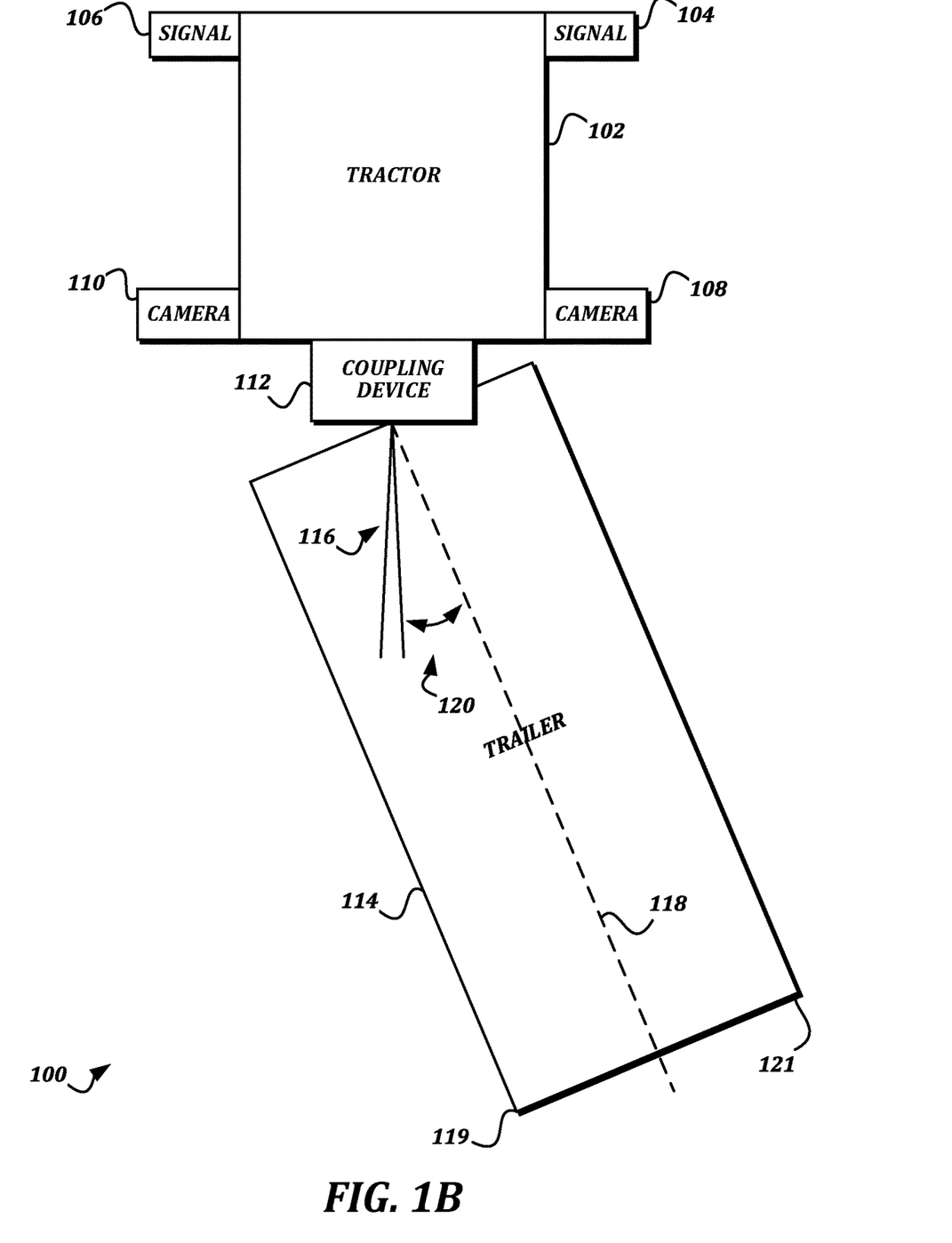
FIG. 1B is a schematic diagram that illustrates the vehicle combination traveling through a right-hand turn.

FIG. 1B is a schematic diagram that illustrates the vehicle combination 100 traveling through a right-hand turn. As shown, the midline 118 has departed from the centered region 116 by a departure angle 120, thus indicating that the vehicle combination 100 is still turning. In some embodiments, the panned, cropped, and zoomed image generated from the wide-angle image captured by the camera 108 may be digitally zoomed out or panned to the right in order to keep the right rear corner 121 of the trailer 114 in the image. As the vehicle combination 100 completes the turn and returns to traveling straight, the midline 118 will return to the centered region 116.

Figure 2:
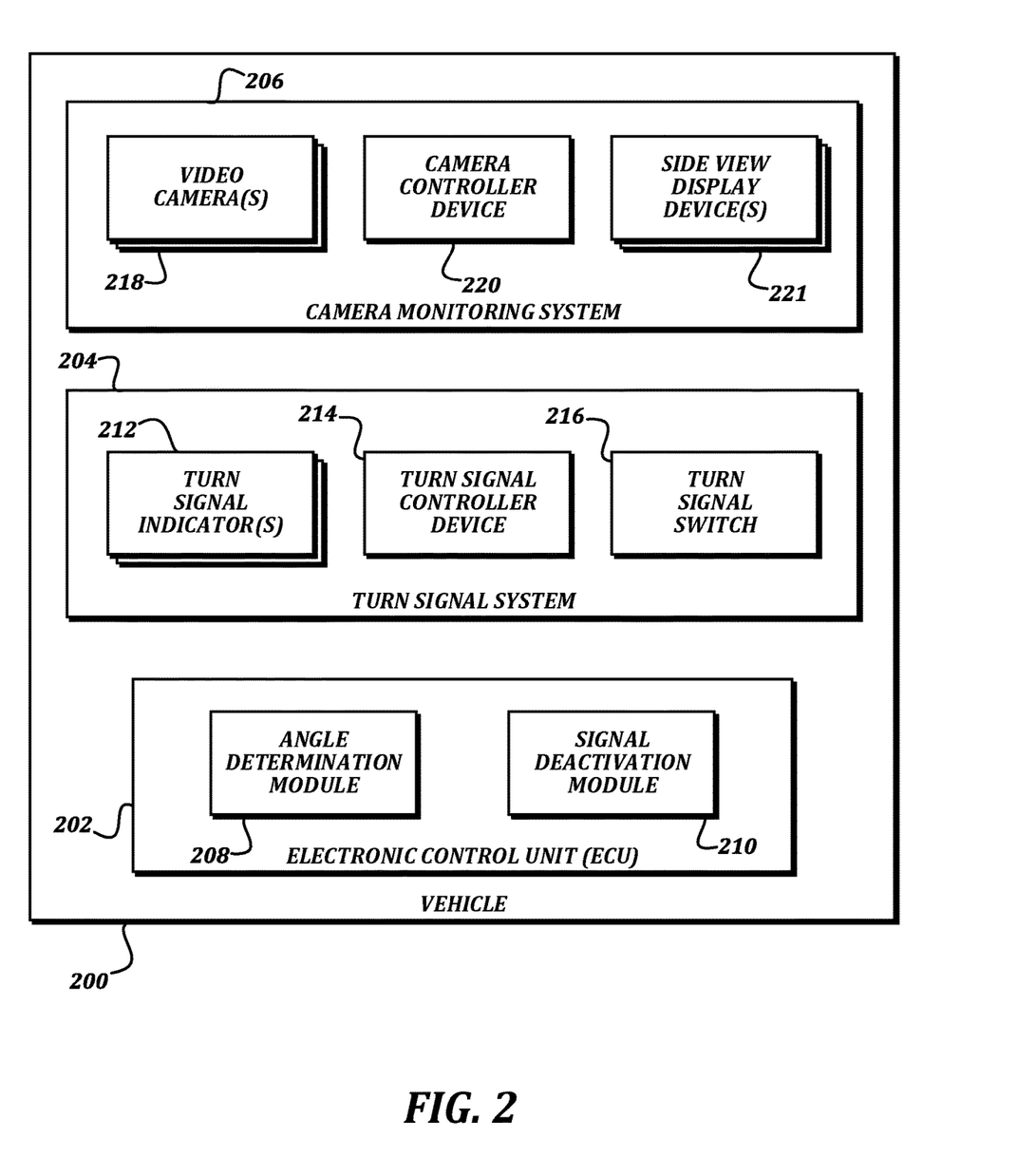
FIG. 2 is a block diagram that illustrates an example embodiment of a vehicle according to various aspects of the present disclosure.

FIG. 2 is a block diagram that illustrates an example embodiment of a vehicle according to various aspects of the present disclosure. The vehicle 200 is an example of a tractor 102 or vehicle combination 100 as discussed above. As shown, the vehicle 200 includes an electronic control unit (ECU) 202, a turn signal system 204, and a camera monitoring system 206. In some embodiments, the ECU 202 may include one or more memory devices including but not limited to a random access memory ("RAM") and an electronically erasable programmable read-only memory ("EEPROM"), and one or more processors. The ECU 202 may be communicatively coupled to the turn signal system 204 and the camera monitoring system 206 using any suitable vehicle networking technology, including but not limited to a CANBUS system and a wireless network such as WiFi or Bluetooth. In some embodiments, the turn signal system 204 and the camera monitoring system 206 may also be implemented within the ECU 202, while in some embodiments one or more of the turn signal system 204 and the camera monitoring system 206 may be implemented within separate devices or other ECUs. These components 202, 204, 206 are shown in FIG. 2 as separate single blocks for ease of discussion only.

In some embodiments, the turn signal system 204 includes two or more turn signal indicators 212, a turn signal controller device 214, and a turn signal switch 216. The turn signal indicators 212 are typically lights arranged around the perimeter of the vehicle combination 100. In some embodiments, some turn signal indicators 212 may be located on the tractor 102, and some may be located on the trailer 114, though all of the turn signal indicators 212 are controlled by the turn signal controller device 214 of the tractor 102. The turn signal switch 216 is used by the operator to signal their intent to turn. Typically, the turn signal indicators 212 can be activated by the operator by moving the turn signal switch 216 from a neutral state to an activated state, and the indicators 212 remain in the activated state until canceled. The turn signal controller device 214 receives signals from the turn signal switch 216 indicating the state of the turn signal switch 216, and activates or deactivates the appropriate turn signal indicators 212 accordingly. The turn signal system 204 may be configured to provide the state of the turn signal switch 216 to the ECU 202.

In some embodiments, the camera monitoring system 206 includes one or more video cameras 218, a camera controller device 220, and one or more side view display devices 221. In some embodiments, the camera controller device 220 may receive wide-angle video from the video cameras 218, generate digitally panned, zoomed, and/or cropped versions of the video that include the rear corners of the trailer 114, and provide the digitally panned, zoomed, and/or cropped versions of the video to the side view display devices 221 for display. The camera controller device 220 may also be configured to provide the panned, zoomed, and/or cropped versions of the video, as well as the raw wide-angle video, to other components of the vehicle 200.

Figure 3A:
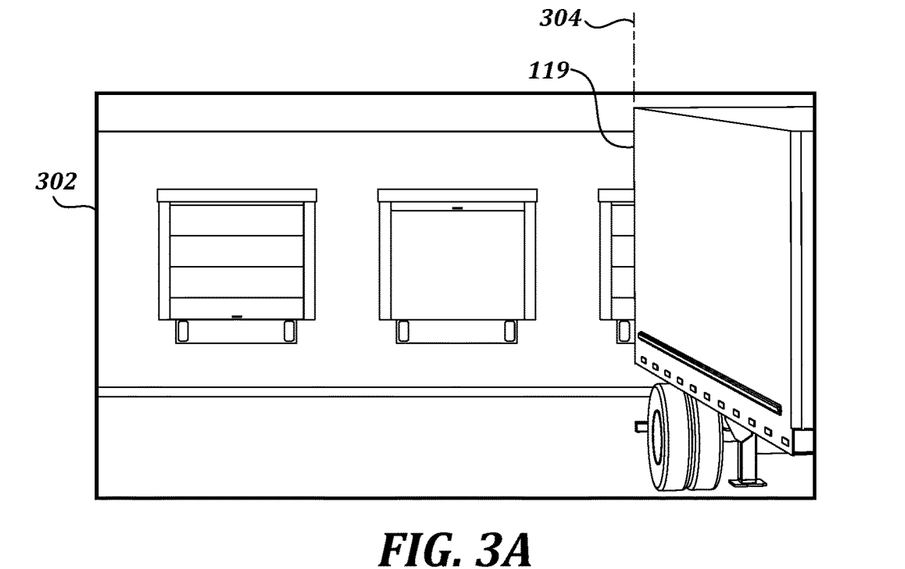
FIG. 3A illustrates an example embodiment of a raw wide-angle video according to various aspects of the present disclosure.
Figure 3B:
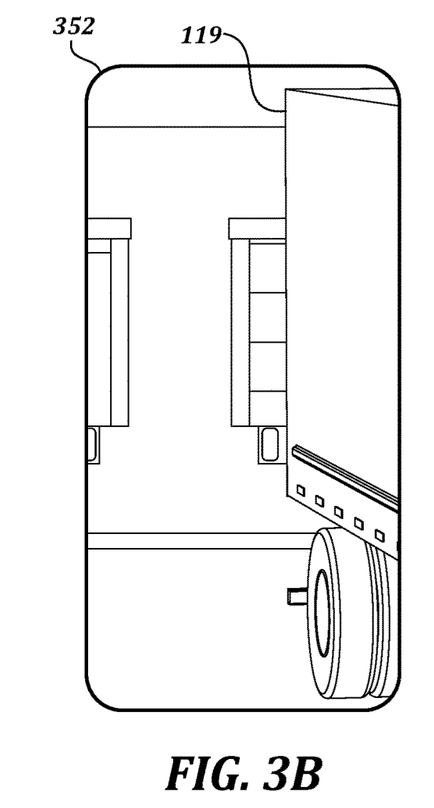
FIG. 3B illustrates an example embodiment of a panned, zoomed, and/or cropped version of the raw wide-angle video according to various aspects of the present disclosure.
Figure 3C:
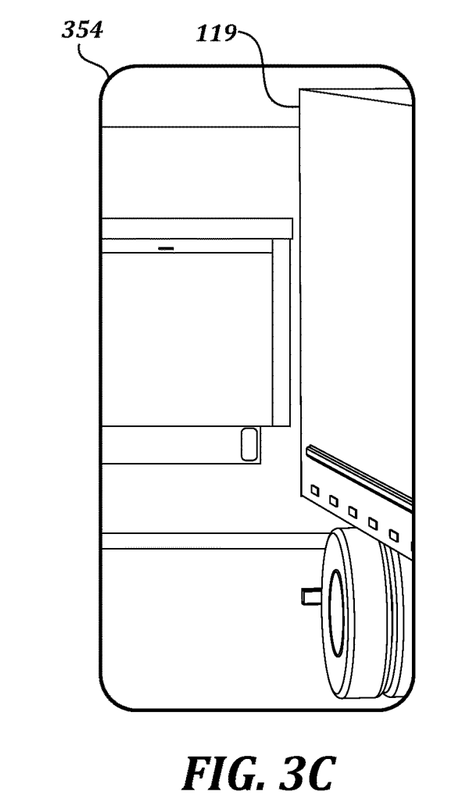
FIG. 3C illustrates another example embodiment of a panned, zoomed, and/or cropped version of the raw wide-angle video according to various aspects of the present disclosure.

FIG. 3A illustrates an example embodiment of a raw wide-angle video according to various aspects of the present disclosure. The raw wide-angle video 302 shows the entire image captured by one of the video cameras 218. When the vehicle 100 turns, the rear corner 119 will move side-to-side within the raw wide-angle video 302, but the overall field of view of the raw wide-angle video 302 will not change with respect to the vehicle 100 frame of reference. FIG. 3B illustrates an example embodiment of a panned, zoomed, and/or cropped version of the raw wide-angle video according to various aspects of the present disclosure. The video 352 is zoomed and cropped in order to substantially match a scene that would be visible in a traditional side view mirror, and is digitally panned to include the rear corner 119 even when the vehicle 100 is turning. The video 352 is unsuitable for use to determine the angle of the trailer 114, at least because the camera monitoring system 206 may manipulate the video 352 to keep the rear corner of the trailer 114 in the same relative location within the video 352. In comparison, the rear corner of the trailer 114 moves horizontally within the video 302. For example, FIG. 3C illustrates another example embodiment of a panned, zoomed, and/or cropped version of the raw wide-angle video as the vehicle 100 is backing and turning to the right. Because the angle of the trailer 114 has changed, the visible portion of the raw wide angle video 302 depicted in the video 354 has changed, though the rear corner 119 of the trailer 114 appears in relatively the same location in the video 354.

While FIGS. 3A-3C illustrate a left side view mirror, a view from a camera 110 on the left side of the vehicle 100, and a left rear corner 119, one of ordinary skill in the art will recognize that a right side view mirror, a view from a camera 108 on the right side of the vehicle 100, and a right rear corner 121 could be used instead of or in addition to the examples in the FIGURES.

In some embodiments, the ECU 202 (FIG. 2) includes an angle determination module 208 and a signal deactivation module 210. In general, the word "module," as used herein, refers to logic embodied in hardware or software instructions, which can be written in a programming language, such as C, C++, COBOL, JAVA™, PHP, Perl, HTML, CSS, JavaScript, VBScript, ASPX, Microsoft.NET™, and/or the like. A module may be compiled into executable programs or written in interpreted programming languages. Software modules may be callable from other modules or from themselves. Generally, the modules described herein refer to logical modules that can be merged with other modules, or can be divided into modules. As a nonlimiting example, in some embodiments, the angle determination module 208 and the signal deactivation module 210 may be combined into a single module. The modules can be stored in any type of computer-readable medium or computer storage device and be stored on and executed by one or more processors of an ECU, or by general purpose computers, thus creating a special purpose computer configured to provide the module.

In some embodiments, the angle determination module 208 receives information from the camera monitoring system 206, which may include a value that indicates the rotational position of the trailer 114 with respect to the coupling device 112, or may include information from which the angle determination module 208 can derive the rotational position. For example, the angle determination module 208 may receive the raw wide-angle video from the camera controller device 220. Using edge detection techniques, the angle determination module 208 may find the rear corner 121 of the trailer 114 within the raw wide-angle video. The horizontal location 304 of the detected edge in the raw wide-angle video (as illustrated in FIG. 3A) may then be used to either determine the angle of the trailer 114, or as a proxy for the angle of the trailer 114. The horizontal location 304 may be provided as a number of pixels from a left side or a right side of the raw wide-angle video, or in any other suitable way.

The use of horizontal location of the detected edge as a proxy for angle can provide multiple technical benefits, including but not limited to reducing the complexity of the calculation of the trailer angle, increasing the accuracy of the calibration techniques and the sensitivity of the signal deactivation techniques, and reducing the complexity of integrating the turn signal deactivation technology into a vehicle. Though the use of edge detection to find the rear corners of the trailer 114 is described, in some embodiments, computer vision techniques other than edge detection may be used to find other portions of the trailer 114 from which the trailer angle can be determined, including but not limited to the front corners of the trailer 114, a decal applied to the trailer 114, or the like. The detection of the rear corners of the trailer 114 may provide benefits over these other techniques, however, such as providing greater sensitivity due to the distance from the camera, and the ability to work with any trailer 114 regardless of whether it has a specific label or decal applied.

In some embodiments, the angle determination module 208 may store one or more previously determined angles in order to perform processing based on a rate or direction of change of the angle. In some embodiments, the signal deactivation module 210 uses the angles determined by the angle determination module 208 to detect events or situations wherein the turn signal should be automatically deactivated, as discussed further below.

Figure 4A:
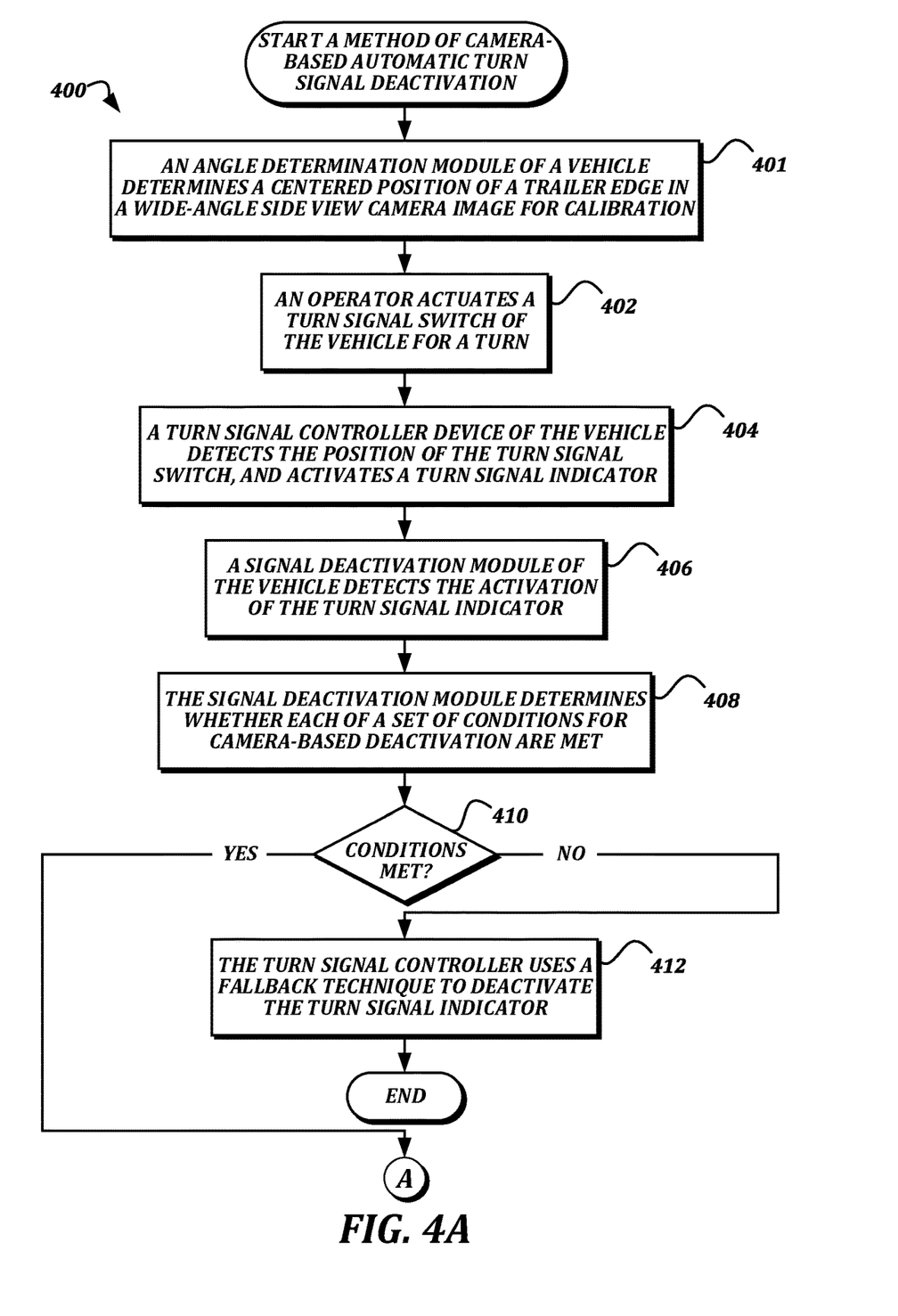
FIGS. 4A-4B are a flowchart that illustrates an example embodiment of a method of camera-based automatic turn signal deactivation according to various aspects of the present disclosure.
Figure 4B:
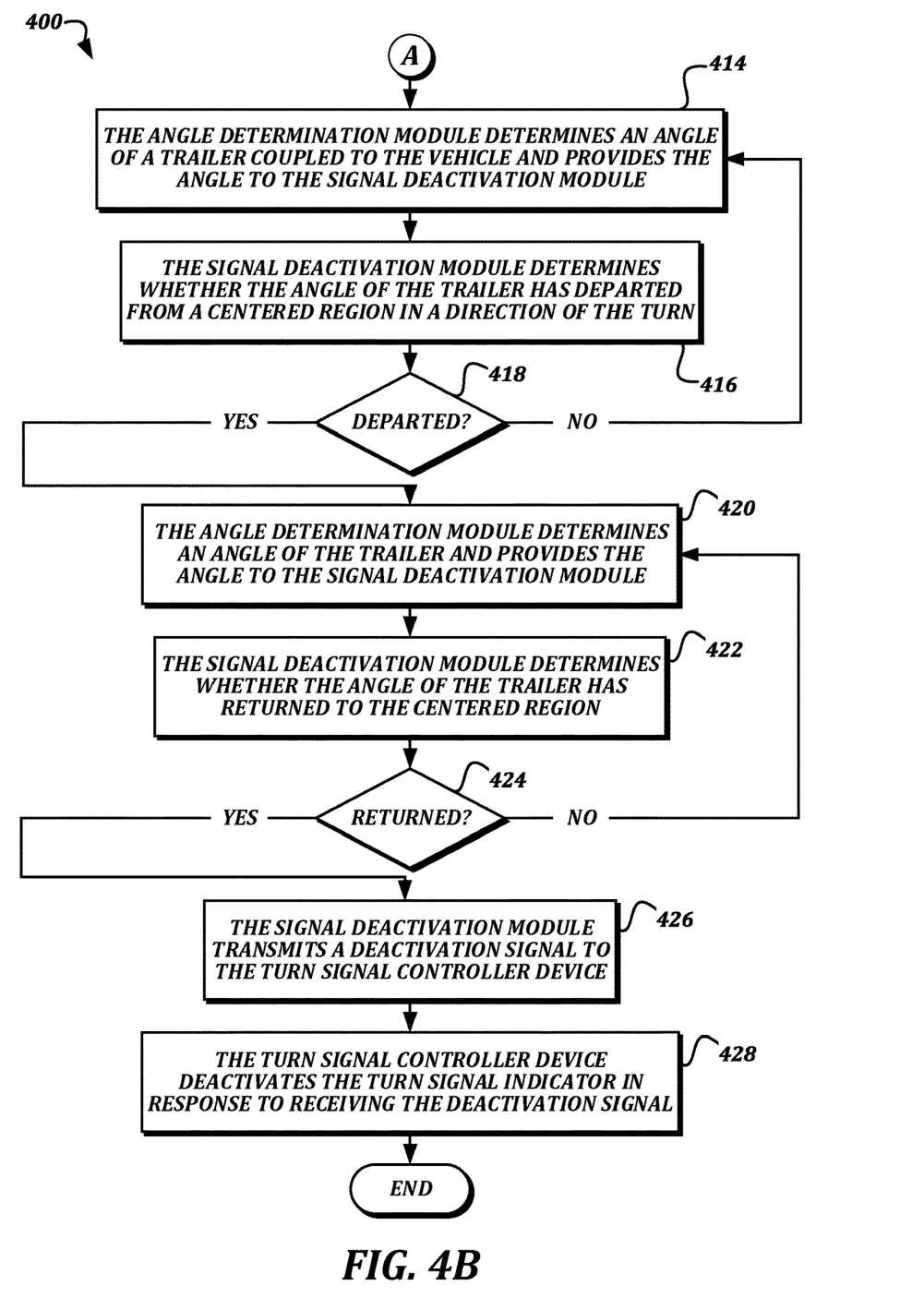

FIGS. 4A-4B are a flowchart that illustrates an example embodiment of a method of camera-based automatic turn signal deactivation according to various aspects of the present disclosure. From a start block, the method 400 proceeds to block 401, where an angle determination module 208 of a vehicle 200 determines a centered position of a trailer edge in a wide-angle side view camera image for calibration. To do so, the angle determination module 208 may first determine whether the trailer 114 is actually straight and in a suitable position for center point calibration using any suitable technique. For example, the angle determination module 208 may use edge detection to locate a horizontal position of the edges in a left-side view and a right-side view, and determine that the trailer 114 is centered if the horizontal positions are balanced (e.g., the left rear corner 119 is substantially the same distance from the left edge of the left-side view as the right rear corner 121 is from the right edge of the right-side view). As another example, the angle determination module 208 may use an angle value from a steering angle sensor that reports a position of the steering wheel to determine that the steering wheel is straight (e.g., located at zero degrees rotation) and a speed value from a vehicle speed sensor to determine that the vehicle 100 is moving in combination with a determination that the horizontal positions of the rear corners 119, 121 are not substantially changing in the wide-angle views to determine that the trailer 114 is centered. Once the angle determination module 208 determines that the trailer 114 is centered, the angle determination module 208 records the detected horizontal positions of the rear corners in the wide-angle views as the centered positions, and the system is calibrated.

Next, the method 400 proceeds to block 402, where an operator actuates a turn signal switch 216 of the vehicle 200 for a turn. At block 404, a turn signal controller device 214 of the vehicle 200 detects the actuation of the turn signal switch 216, and activates a turn signal indicator 212. Activating the turn signal indicator 212 may include causing power to be supplied to one or more turn signal indicators 212 associated with the direction of turn indicated by the turn signal switch 216, or may otherwise cause the associated turn signal indicators 212 to be turned on.

At block 406, a signal deactivation module 210 of the vehicle 200 detects the activation of the turn signal indicator 212. In some embodiments, the signal deactivation module 210 may receive a signal from the turn signal controller device 214 indicating that the turn signal indicator 212 has been activated. In some embodiments, the signal deactivation module 210 may detect the signal transmitted from the turn signal controller device 214 to the turn signal indicator 212. In some embodiments, the signal deactivation module 210 may directly monitor the state of the turn signal switch

216. In other embodiments, any other suitable technique may be used to provide the relevant information to the signal deactivation module 210.

At block 408, the signal deactivation module 210 determines whether each of a set of conditions for camera-based deactivation are met. In some embodiments, the set of conditions may define situations in which it is appropriate to automatically cancel the turn signal based on the rotational angle of the trailer 114. Some nonlimiting examples of suitable conditions include being in a forward gear (instead of a reverse gear), verification of validity of data received from the camera monitoring system 206 (for example, ensuring that the angle determination module 208 can detect the edges of the rear corners of the trailer 114), and verification that the trailer 114 is present (using, for example, a load estimator).

Next, the method 400 proceeds to a decision block 410, where a decision is made based on whether the set of conditions for camera-based deactivation are met. If at least one of the conditions is not met, then the decision at decision block 410 is NO, and the method 400 proceeds to block 412, where the turn signal controller device 214 uses a fallback technique to deactivate the turn signal indicator 212. Some nonlimiting examples of fallback techniques include using a timer, using a steering angle sensor, and using an audio reminder to the operator to manually cancel the turn signal. The method 400 then proceeds to an end block and terminates.

Otherwise, if all of the conditions for camera-based deactivation are met, then the decision at block 410 is YES, and the method 400 proceeds to a continuation terminal ("terminal A"). From terminal A (FIG. 4B), the method 400 proceeds to block 414, where an angle determination module 208 of the vehicle 200 determines an angle of a trailer 114 coupled to the vehicle 200 and provides the angle to the signal deactivation module 210. In some embodiments, the angle determination module 208 may use edge detection to find the rear corners of the trailer 114 in the wide-angle videos provided by the cameras 108, 110, and may determine the horizontal locations of the detected edges within the wide-angle videos. The angle determination module 208 may then compare the determined horizontal locations to the horizontal locations previously stored during the calibration sequence described in block 401.

The angle determination module 208 may compute an angle based on the deviation of the horizontal location and provide the angle to the signal deactivation module 210, or may simply provide the difference in horizontal location as the angle to the signal deactivation module 210. Hence, in some embodiments, the angle determination module 208 may provide a value such as "left five degrees" or "right five degrees," and in some embodiments, the angle determination module 208 may provide a value such as "left ten pixels" or "right ten pixels." The particular units of the value provided by the angle determination module 208 should not affect the further processing, other than that the definition of the "centered region" may be specified in the same units as the value provided by the angle determination module 208. In other words, as two non-limiting examples, the centered region may be five degrees wide, or may be ten pixels wide, depending on the units.

Next, at block 416, the signal deactivation module 210 determines whether the angle of the trailer 114 has departed from a centered region 116 in a direction of the turn. In some situations, the rotational angle of the trailer 114 may first depart from the centered region 116 in a direction opposite the turn. For example, if the vehicle 100 is making a right-hand turn, the operator may first have to turn to the left in order to gain space for the trailer 114 to clear the corner. Hence, simply detecting a departure from the centered region 116 in any direction may lead to premature cancellations.

The method 400 then proceeds to a decision block 418, where a decision is made based on whether or not it was determined that the angle of the trailer 114 has departed from the centered region 116 in the direction of the turn. If it was not determined that the angle has so departed, then the decision at decision block 418 is NO, and the method 400 returns to block 414 to again check the angle of the trailer. A person of ordinary skill in the art will recognize this as a control loop that monitors the rotational position of the trailer 114 until the departure is detected. Otherwise, if it was determined that the angle had departed from the centered region 116 in the direction of the turn, then the decision at decision block 418 is YES, and the method 400 proceeds to block 420.

At block 420, the angle determination module 208 determines an angle of the trailer 114 and provides the angle to the signal deactivation module 210. This angle is determined and provided using methods similar to those discussed above with respect to block 414. At block 422, the signal deactivation module 210 determines whether the angle of the trailer 114 has returned to the centered region 116. As discussed above, the centered region 116 may be a predetermined number of degrees from a center line, such as two degrees; a predetermined number of pixels from a calibrated centered location, such as ten pixels; or some other number of degrees or pixels that may be configurable by the operator. The use of a centered region 116, instead of merely using the point at which the trailer 114 is perfectly aligned with the tractor 102, allows for some amount of uncertainty due to misalignment, traversing inclines, or other reasons for which the trailer 114 may not be perfectly aligned with the tractor 102 even if the vehicle combination 100 is traveling straight.

The method 400 then proceeds to a decision block 424, where a decision is made based on whether the angle of the trailer 114 has been determined to have returned to the centered region 116. In some embodiments, the decision may be based on whether the angle of the trailer 114 has been determined to have returned to the centered region 116 for at least a predetermined threshold amount of time. In some embodiments, the decision may also be based on whether a steering angle has been determined to have returned to a centered steering position. If it is determined that the angle has not returned to the centered region 116, then the decision at decision block 424 is NO, and the method 400 returns to block 420. A person of ordinary skill in the art will recognize these steps as a control loop that monitors the rotational position of the trailer 114 until a return to the centered region 116 is detected.

Otherwise, if it was determined that the angle of the trailer 114 has returned to the centered region 116, then the decision at decision block 424 is YES, and the method 400 proceeds to block 426, where the signal deactivation module 210 transmits a deactivation signal to the turn signal controller device 214. Next, at block 428, the turn signal controller device 214 deactivates the turn signal indicator 212 in response to receiving the deactivation signal. The method 400 then proceeds to an end block and terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle, comprising:
   a camera monitoring system including at least one video camera configured to view side areas of the vehicle;
   a turn signal indicator for signaling a turn to a side of the vehicle;
   an electronic control unit (ECU) configured to:
      receive a signal indicating that the turn signal indicator has been activated; and
      in response to determining that a set of conditions for camera-based signal deactivation are each met:
         determine, based on information received from the camera monitoring system, that an angle of a trailer coupled to the vehicle has departed from a centered region in the direction of the turn signal indicator, wherein the centered region is defined as a predetermined angular range of the trailer with respect to the vehicle; and
         in response to determining, based on information received from the camera monitoring system, that the angle of the trailer has returned to the centered region from the direction of the turn signal indicator, transmit a signal to deactivate the turn signal indicator.

2. The vehicle of claim 1, wherein the information received from the camera monitoring system includes:
   at least one wide-angle video from a viewpoint positioned to depict substantially all of a range of motion of at least one rear corner of the trailer.

3. The vehicle of claim 2, wherein the ECU is further configured to determine the angle of the trailer based on the information received from the camera monitoring system by:
   using edge detection to find an edge of a rear corner of the trailer in the at least one wide angle video; and
   determining a horizontal location of the detected edge of the rear corner within the wide angle video.

4. The vehicle of claim 1, wherein the set of conditions for camera-based signal deactivation includes a determination that a trailer is coupled to the vehicle.

5. The vehicle of claim 1, wherein the set of conditions for camera-based signal deactivation includes a determination that the vehicle is either stationary or moving forward.

6. The vehicle of claim 1, wherein the ECU is further configured to:
   in response to determining that a condition of the set of conditions for camera-based signal deactivation is not met, transmit a signal to deactivate the turn signal indicator based on one or more of a timer, a steering wheel angle, or information received from a lane departure sensor.

7. The vehicle of claim 1, wherein the vehicle is a Class 8 truck.

8. A method of automatically controlling a turn signal in a vehicle coupled to a trailer, the method comprising:
   receiving, by an ECU of the vehicle, a signal indicating that a turn signal indicator has been activated; and
   in response to determining that a set of conditions for camera-based signal deactivation are each met:
      determining, by the ECU based on information received from a camera monitoring system, that an angle of the trailer has departed from a centered region in the direction of the turn signal indicator, wherein the centered region is defined as a predetermined angular range of the trailer with respect to the vehicle; and
      in response to determining, based on information received from the camera monitoring system, that the angle of the trailer has returned to the centered region from the direction of the turn signal indicator, transmitting, by the ECU, a signal to deactivate the turn signal indicator.

9. The method of claim 8, wherein the information received from the camera monitoring system includes at least one wide-angle video from a viewpoint positioned to depict substantially all of a range of motion of at least one rear corner of the trailer.

10. The method of claim 9, further comprising determining the angle of the trailer based on the information received from the camera monitoring system by:
    using, by the ECU, edge detection to find an edge of a rear corner of the trailer in the at least one wide angle video; and
    determining, by the ECU, a horizontal location of the detected edge of the rear corner within the wide angle video.

11. The method of claim 8, wherein the set of conditions for camera-based signal deactivation includes a determination that a trailer is coupled to the vehicle.

12. The method of claim 8, wherein the set of conditions for camera-based signal deactivation includes a determination that the vehicle is either stationary or moving forward.

13. The method of claim 8, further comprising:
    in response to determining that a condition of the set of conditions for camera-based signal deactivation is not met, transmitting, by the ECU, a signal to deactivate the turn signal indicator based on one or more of a timer, a steering wheel angle, or information received from a lane departure sensor.

14. The method of claim 8, wherein the vehicle is a Class 8 truck.

15. A non-transitory computer-readable medium having computer-executable instructions stored thereon that, in response to execution by an electronic control unit (ECU) of a vehicle, cause the ECU to perform actions for automatically controlling a turn signal in a vehicle coupled to a trailer, the actions comprising:
    receiving, by an ECU of the vehicle, a signal indicating that a turn signal indicator has been activated; and
    in response to determining that a set of conditions for camera-based signal deactivation are each met:
       determining, by the ECU based on information received from a camera monitoring system, that an angle of the trailer has departed from a centered region in the direction of the turn signal indicator, wherein the centered region is defined as a predetermined angular range of the trailer with respect to the vehicle; and
       in response to determining, based on information received from the camera monitoring system, that the angle of the trailer has returned to the centered region from the direction of the turn signal indicator, transmitting, by the ECU, a signal to deactivate the turn signal indicator.

16. The computer-readable medium of claim 15, wherein the information received from the camera monitoring system includes at least one wide-angle video from a viewpoint positioned to depict substantially all of a range of motion of at least one rear corner of the trailer.

17. The computer-readable medium of claim 16, wherein the actions further comprise determining the angle of the trailer based on the information received from the camera monitoring system by:

using, by the ECU, edge detection to find an edge of a rear corner of the trailer in the at least one wide angle video; and determining, by the ECU, a horizontal location of the detected edge of the rear corner within the wide angle video.

18. The computer-readable medium of claim 15, wherein the set of conditions for camera-based signal deactivation includes a determination that a trailer is coupled to the vehicle.

19. The computer-readable medium of claim 15, wherein the set of conditions for camera-based signal deactivation includes a determination that the vehicle is either stationary or moving forward.

20. The computer-readable medium of claim 15, wherein the actions further comprise:

in response to determining that a condition of the set of conditions for camera-based signal deactivation is not met, transmitting, by the ECU, a signal to deactivate the turn signal indicator based on one or more of a timer, a steering wheel angle, or information received from a lane departure sensor.

\* \* \* \* \*